(12) United States Patent  (10) Patent No.: US 9,109,572 B2
Ward  (45) Date of Patent: Aug. 18, 2015

(54) SYSTEM AND METHOD TO RECAPTURE ENERGY OF A HYDRAULIC MOTOR

(76) Inventor: Donald A. Ward, Lady Lake, FL (US)

( * ) Notice: Subject to any disclaimer, the term of this patent is extended or adjusted under 35 U.S.C. 154(b) by 801 days.

(21) Appl. No.: 13/104,270

(22) Filed: May 10, 2011

(65) Prior Publication Data

US 2011/0209469 A1  Sep. 1, 2011

Related U.S. Application Data

(63) Continuation-in-part of application No. 12/605,877, filed on Oct. 26, 2009, now abandoned.

(60) Provisional application No. 61/175,943, filed on May 6, 2009.

(51) Int. Cl.
*F03B 17/04* (2006.01)
*F03G 7/10* (2006.01)

(52) U.S. Cl.
CPC . *F03B 17/04* (2013.01); *F03G 7/10* (2013.01); *Y02E 10/20* (2013.01)

(58) Field of Classification Search
CPC ....................................................... F03B 17/04

USPC .................................. 60/419; 92/72; 417/273
See application file for complete search history.

(56) References Cited

U.S. PATENT DOCUMENTS 5,251,442 A * 10/1993 Roche .............................. 60/368
2004/0065192 A1* 4/2004 Akasaka et al. ................. 91/491

* cited by examiner

*Primary Examiner* — F. Daniel Lopez
(74) *Attorney, Agent, or Firm* — Allen, Dyer, Doppelt, Milbrath & Gilchrist, P.A.

(57) ABSTRACT

A system and method to recapture energy of a hydraulic motor is disclosed. The system includes a plurality of pistons disposed about a periphery of a flywheel, wherein each piston is compressed by a roller during each revolution of the flywheel. As each piston is engaged and pushes against the roller, the piston is biased inward and forces hydraulic fluid out of the cylinder recapturing energy as pressure to the system when the flywheel is rotating under its own rotational inertia. In addition, the piston pushing against the roller causes the flywheel to continue to rotate. As the force acting on the piston causes the flywheel to rotate, the next piston starts to approach the position of the prior piston. This action continues as long as the fluid is under pressure when it enters each cylinder.

15 Claims, 6 Drawing Sheets

SYSTEM AND METHOD TO RECAPTURE ENERGY OF A HYDRAULIC MOTOR

I. CROSS REFERENCE TO RELATED APPLICATIONS

This application is a continuation of U.S. patent application Ser. No. 12/605,877 filed Oct. 26, 2009, entitled "System and Method of Maintaining Pressure of a Hydraulic Motor" and also claims the benefit of U.S. provisional patent application Ser. No. 61/175,943, filed May 6, 2009.

II. FIELD OF THE INVENTION

The present invention relates generally to hydraulic motors.

III. BACKGROUND

A hydraulic motor is a mechanical actuator that converts hydraulic fluid pressure and flow into torque and angular displacement (rotation). The hydraulic motor is the rotary counterpart of the hydraulic cylinder. A hydraulic motor is similar to a hydraulic pump but performs the opposite function. A hydraulic motor is usually designed for the working pressure at both sides of the motor. Hydraulic pumps, motors, and cylinders can be combined into hydraulic drive systems. A hydraulic motor requires constant fluid pressure to continue to run. A shortcoming of the prior art is that the addition of pressure to maintain the hydraulic motor to run, requires additional power, which reduces the efficiency of the hydraulic motor. Accordingly, what is needed is a hydraulic motor that is able to recapture energy that otherwise would be wasted or lost by the hydraulic motor to increase efficiency.

IV. SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In a particular embodiment, a system to recapture energy of a hydraulic motor is disclosed. The system includes a primary tank containing fluid at an operating pressure, where the fluid circulates through the system. The system also includes a hydraulic motor, where the fluid at the operating pressure flows through the hydraulic motor to rotate an output shaft. A flywheel is adapted to rotate about the output shaft. A supply pillow block and a return pillow block support the flywheel about the output shaft. A plurality of reciprocating pistons is mounted about the periphery of the flywheel. In addition, a roller is configured to sequentially engage each piston of the plurality of pistons as the flywheel rotates to increase the pressure of the fluid by compressing the fluid when each piston is engaged by the roller. In particular, when the flywheel is decelerating or otherwise rotating under its own rotational inertia, energy that would be wasted or lost is recaptured by the compression of the pistons to increase the pressure of the fluid.

In another particular embodiment, a method to recapture energy of a hydraulic motor is disclosed. The method includes selecting an operating pressure of a fluid to drive a hydraulic motor and causing the fluid to flow through the hydraulic motor to rotate an output shaft. In addition, the method includes sequentially engaging a plurality of pistons disposed about a periphery of a flywheel mounted to the output shaft and compressing the fluid when each piston is engaged to increase a pressure of the fluid and to recapture energy when the flywheel is rotating under its own rotational inertia. The fluid is then returned to the hydraulic motor.

An advantage of the system is that it is a sealed pressure driven system that runs under hydraulic pressure and emits virtually no exhaust, smog or anything poisonous to the atmosphere compared to a combustion engine. The system operates by using various compartments of hydraulic fluid that are under different pressures and using a specified number of pistons to control the flow of fluid to a flywheel and hydraulic motor to recapture energy due to the rotational inertia of the flywheel. The system may use a high pressure air tank or other means to start and maintain the operating pressure of the system. The system recaptures energy as pressure generated from the pistons within the sealed hydraulic system to replenish a portion of the pressure used to drive the hydraulic motor when the flywheel is rotating under its own rotational inertia.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

VI. DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
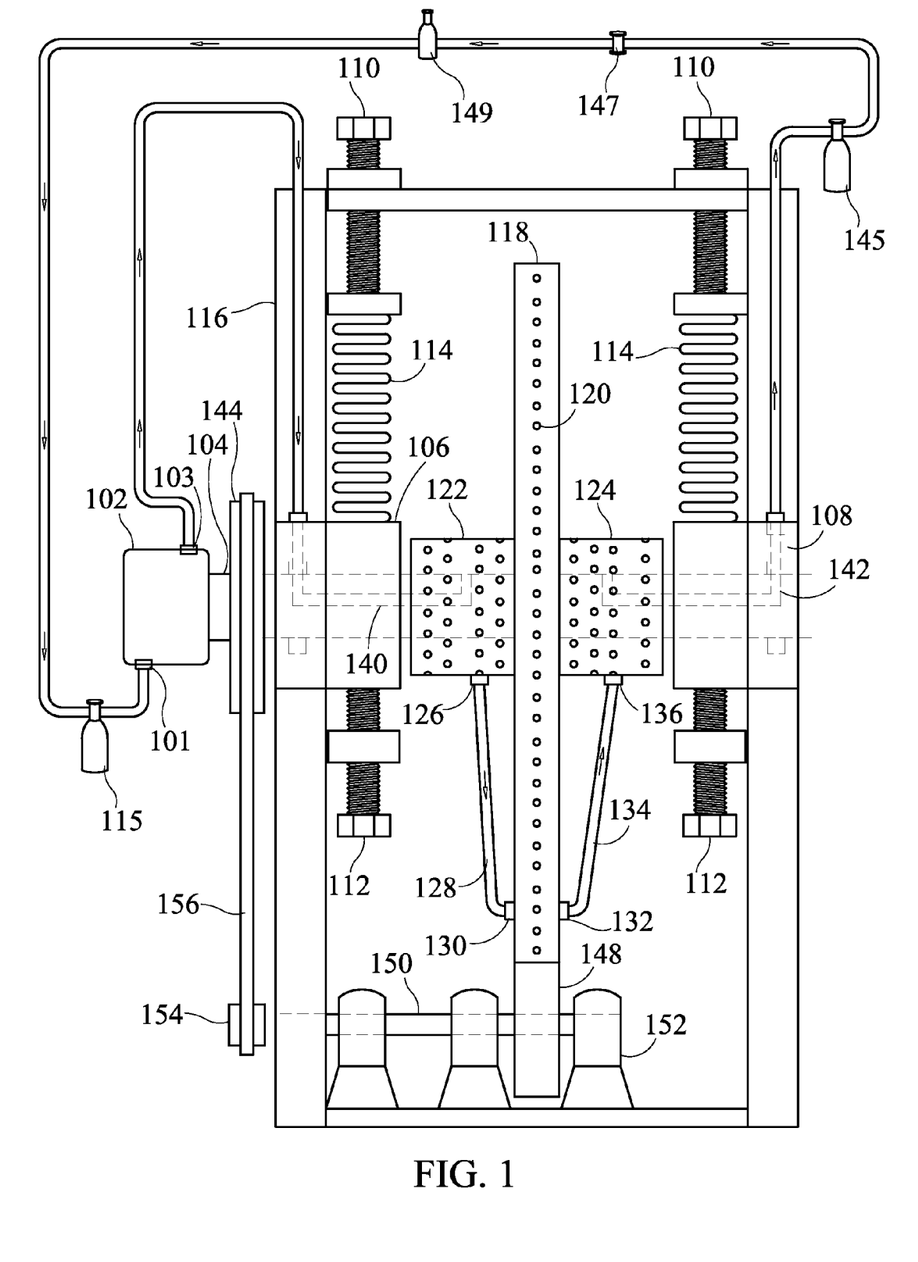
FIG. 1 is a diagram of a particular embodiment of a system to recapture energy of a hydraulic motor.

Referring to FIG. 1, a particular illustrative embodiment of a system to recapture energy of a hydraulic motor is disclosed. A hydraulic motor 102 is in fluid communication with a pressurized fluid. The hydraulic motor 102 may be a radial piston motor, axial piston motor, inline piston motor, or any other type of hydraulic motor that rotates an output shaft 104. A flywheel 118 is mounted between supply and return pillow blocks 106, 108 and is supported by the output shaft 104. The pillow blocks 106, 108 are secured in place using adjustable upper support bolts 110 and lower support bolts 112 that are fastened to a support frame 116. The hydraulic motor 102 rotates the output shaft 104, which rotates the flywheel 118. Springs 114 may be used between the pillow blocks 106 and the support bolts 110 to dampen vibrations as the output shaft 104 and flywheel 102 rotate at a high rpm.

A multitude of piston and cylinder assemblies 120 are located about the periphery of the flywheel 118. A roller 148 is located underneath and adjacent to the flywheel 118. The roller 148 may be mounted anywhere adjacent to the flywheel 118. The roller 148 acts to compress the reciprocating pistons 204 of the piston and cylinder assemblies 120 mounted about the periphery of the flywheel 118 as the flywheel 118 rotates. The roller 148 is mounted about a roller shaft 150 that is connected to a lower pulley 154. The roller 148 is configured to sequentially engage each piston 204 as the flywheel rotates. Roller shaft supports 152 are adjusted to position the roller shaft 150 and roller 148 adjacent to the flywheel 118. A belt 156 is secured around the lower pulley 154 and an upper pulley 144, which is secured to the output shaft 104. An electrical generator may be connected to the output shaft 104 or roller 148 to convert the mechanical energy to electrical energy, generally using electromagnetic induction.

A primary tank 115 contains hydraulic fluid, which is pressurized and is in fluid communication with a high pressure port 101 of the hydraulic motor 102. The primary tank 115 may be initially pressurized by a separate air tank or other means well known in the art. The hydraulic motor 102 receives the fluid at an initial or operational pressure that drives the hydraulic motor 102 to rotate the output shaft 104. In the preferred embodiment, the operational pressure is 1,500 psi. The fluid exits the hydraulic motor 102 via the low pressure port 103 that is in fluid communication with the supply line 138 and at a lower pressure than when entering the hydraulic motor 102. The supply line 138 is secured to the pillow block 106. The pillow block 106 includes a conduit and circumferential channel that is in fluid communication with a shaft supply conduit 140 of the output shaft 104. The shaft supply conduit 140 is in fluid communication with the supply fluid transfer collar 122. Fluid then flows from the supply fluid transfer collar 122 to each of the collar supply ports 126. Each collar supply port 126 is in fluid communication with a respective cylinder supply line 128. Only one cylinder supply line 128 is shown in FIG. 1 for clarity, however, each collar supply port 126 has its own cylinder supply line to each respective cylinder supply port 130 on a supply side of the flywheel 118. For example, if the supply fluid transfer collar includes eighty collar supply ports 126, then there are eighty cylinder supply lines 128 and eighty piston and cylinder assemblies 120 on the flywheel 118. The cylinder supply ports 130 each include a one-way valve to prevent backflow through the cylinder supply lines 128.

A cylinder return port 132 is located on a return side of the flywheel 118 and is in fluid communication with the respective piston and cylinder assembly 120. Fluid flows from the cylinder return port 132 through the cylinder return line 134 to a collar return port 136 in the return fluid transfer collar 124. The cylinder return ports 132 each include a one-way valve to prevent backflow into the piston and cylinder assembly 120. The fluid is then transferred to the shaft return conduit 142 from the return fluid transfer collar 124. The fluid continues to flow out through a return pillow block conduit and circumferential channel to the return line 146 that is secured to the return pillow block 108. The fluid flows to a secondary tank 145 through a check valve 147 to an accumulator 149. The accumulator 149 is in fluid communication with the primary tank 115 and so that the fluid circulates through the system continuously.

Figure 2:
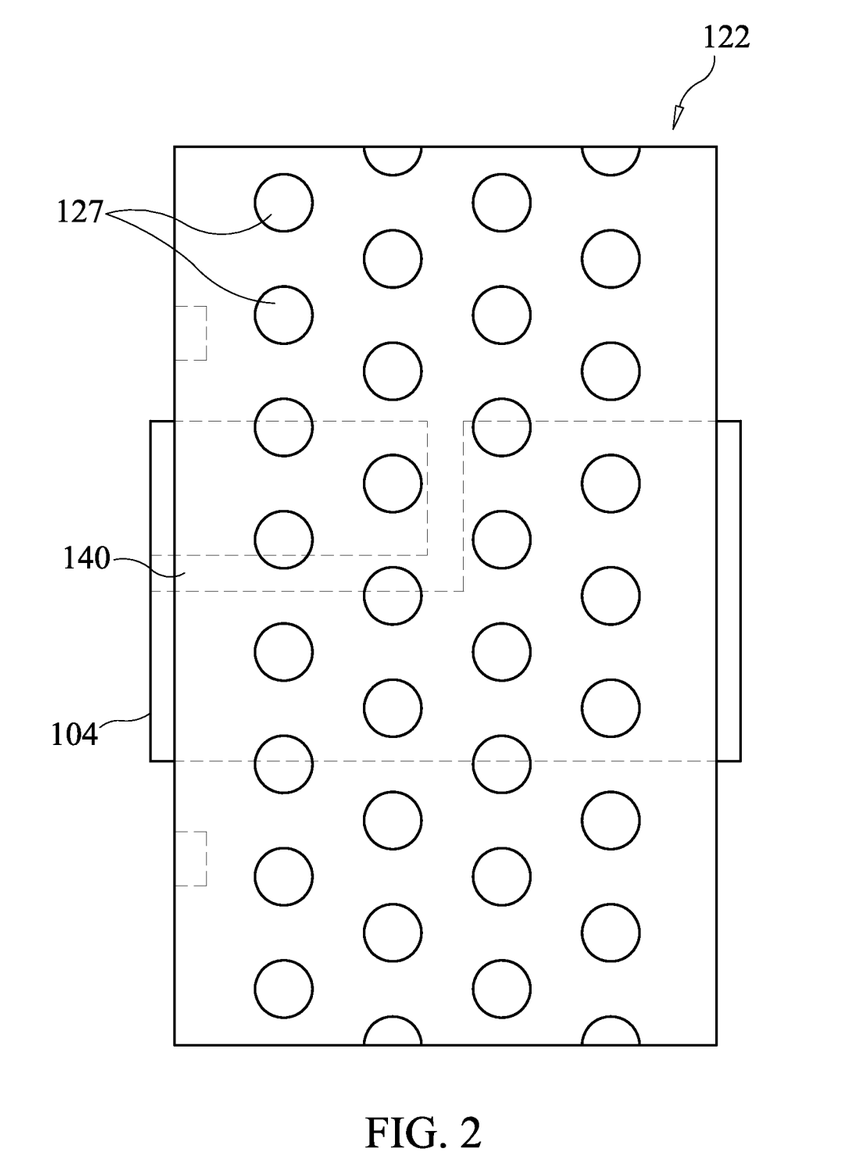
FIG. 2 is a fluid transfer collar of the system shown in FIG. 1.

FIG. 2 shows the supply fluid transfer collar 122. The return fluid transfer collar 124 is similar to the supply fluid transfer collar 122 except that the return fluid transfer collar 124 is mounted to the second side of the flywheel 118 and adapted to receive fluid from the cylinder return lines 134. The supply fluid transfer collar 122 slides over the output shaft 104 and rotates with the output shaft 104. Fluid flows under pressure through the shaft supply conduit 140 to the interior of the supply fluid transfer collar 122. The fluid is then distributed to the numerous threaded apertures 127 machined into the supply fluid transfer collar 122.

Figure 3:
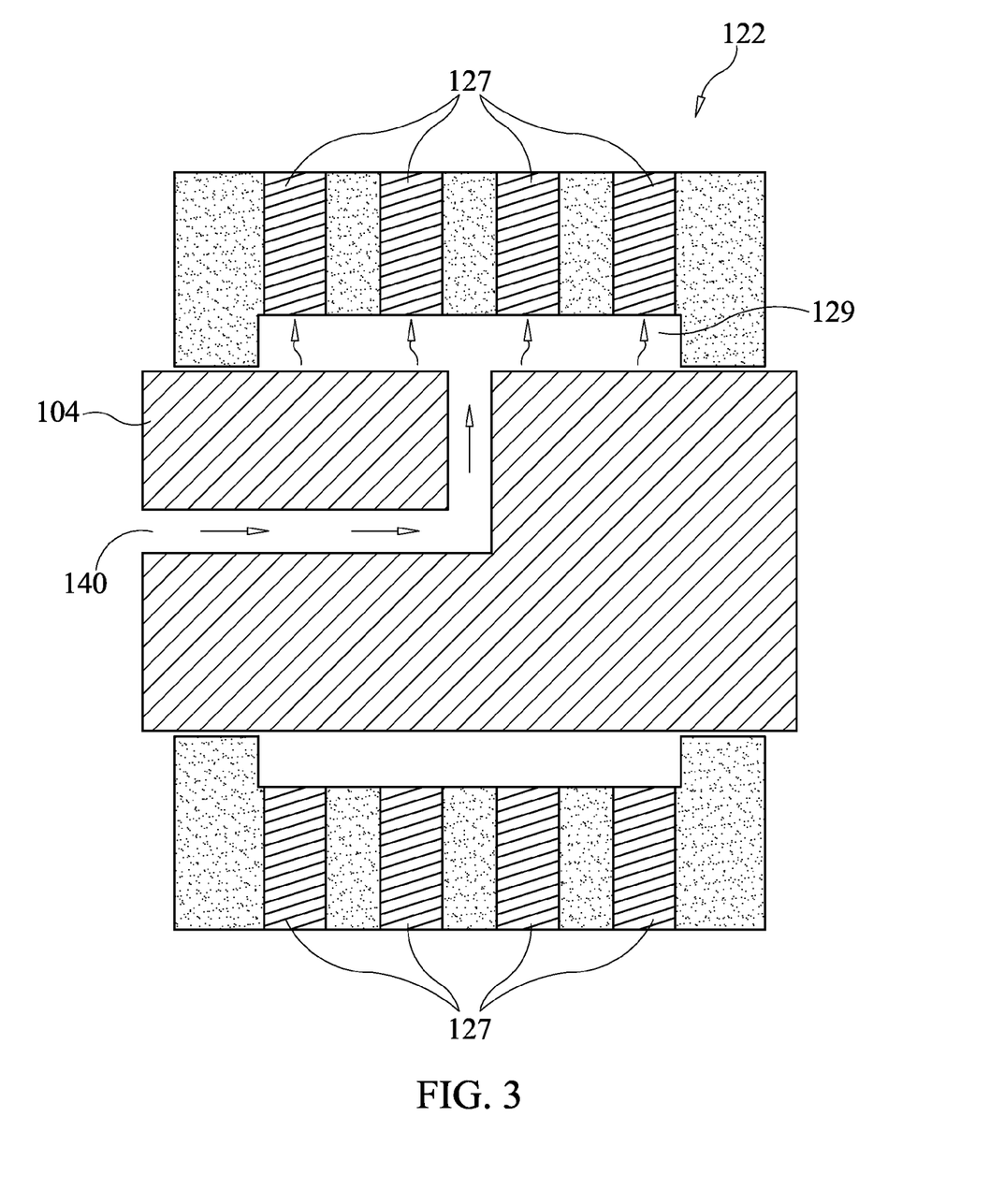
FIG. 3 is a cross sectional view of the fluid transfer collar shown in FIG. 2.

FIG. 3 shows a cross sectional view of the fluid transfer collar 122. The apertures 127 are threaded and each adapted to receive a collar supply port 126. A collar supply circumferential channel 129 in the interior side of the supply fluid transfer collar 122 allows the fluid to flow from the shaft supply conduit to the apertures 127 and collar supply ports 126.

Figure 4:
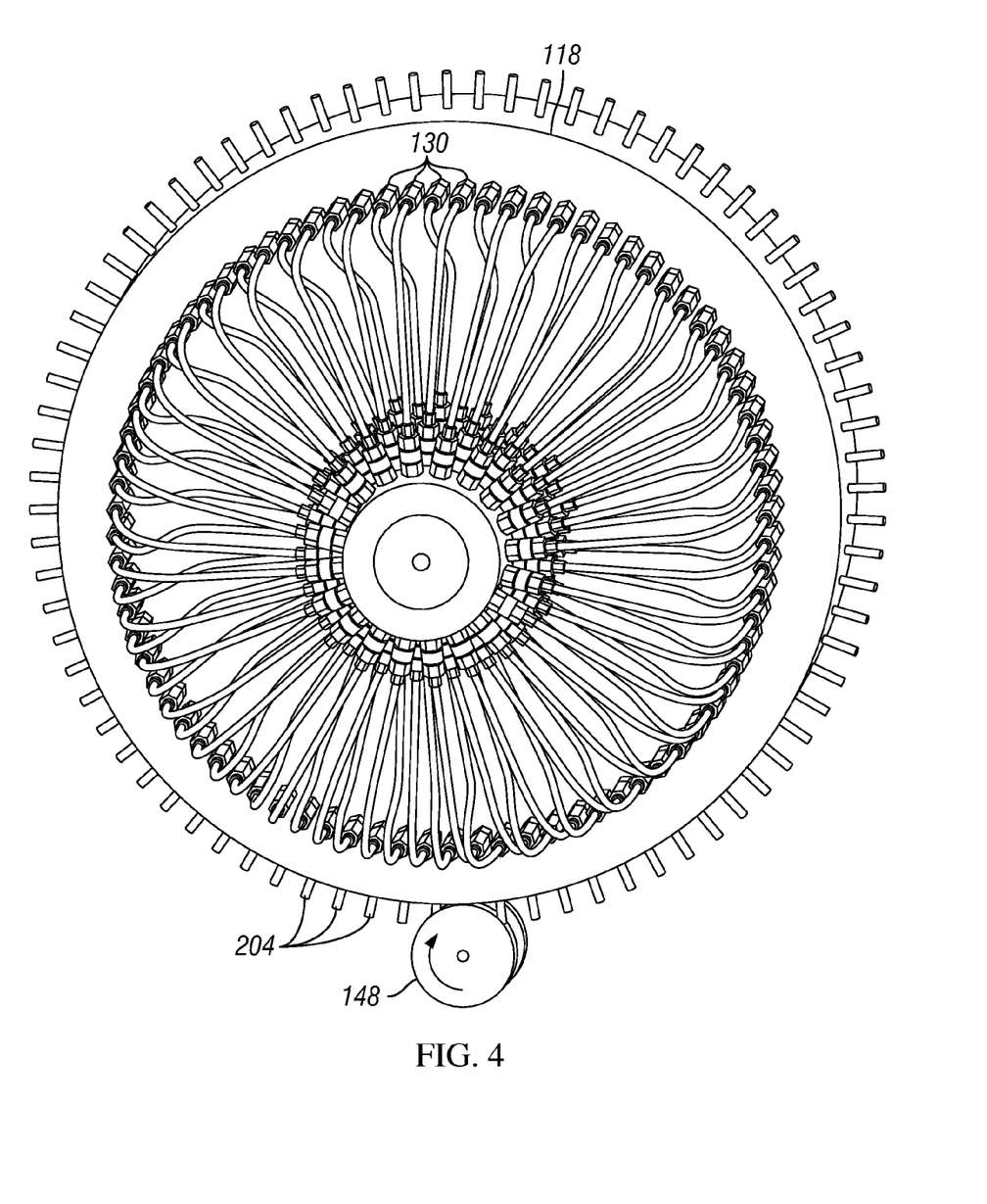
FIG. 4 is an elevational view of a flywheel of a particular embodiment of the system.
Figure 5:
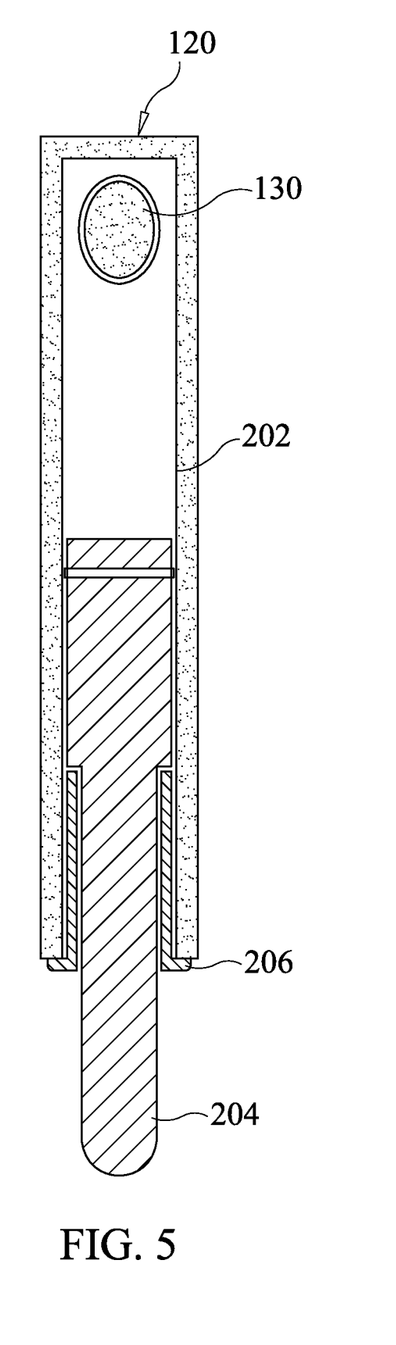
FIG. 5 is a partial cross sectional view of a piston and cylinder of a particular embodiment of the system.
Figure 6:
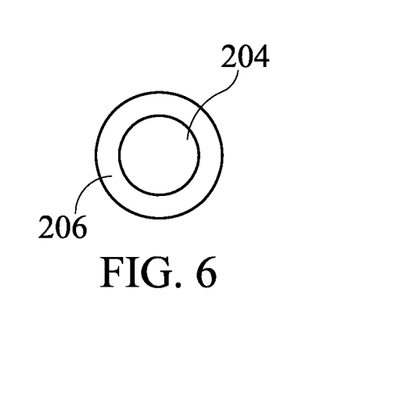
FIG. 6 is a top view of the piston and cylinder shown in FIG. 5.

Referring now to FIGS. 4-6, a piston 204 is shown in an outward position within its respective cylinder 202, where each cylinder 202 is adapted to slidingly engage a respective piston 204. As the fluid is forced into the cylinder 202, the piston 204 is driven outward since the liquid cannot be compressed. When the flywheel 118 rotates, each piston 204 is sequentially pushed against the roller 148. As the piston 204 pushes against the roller 148, the piston 204 is forced inward and, in turn, forces the fluid out of the cylinder 202 and out of the cylinder return port 132 through the cylinder return line 134. The piston 204 pushing against the roller 148 causes the flywheel 118, in part, to continue to rotate. As the force acting on the piston 204 causes the flywheel 118 to rotate, the next piston starts to approach the position of the prior piston. This action continues as long as the fluid is under pressure when it enters each cylinder 202. One-way valves of the cylinder supply and return ports 130, 132 forces the fluid to exit the cylinder 202 in the desired direction. The fluid then returns to the hydraulic motor 102 and the fluid continues to cycle through the hydraulic motor 102 and flywheel 118. For example, if there are eighty cylinders about the periphery of the flywheel 118, then at any one time, seventy-nine pistons are forced outward and one piston is being pushed against the roller 148 (i.e., in compression). The piston under compression causes an increase in the pressure of the system, which in turn, compensates in part for the pressure drop through the hydraulic motor 102 as the system is a closed system. Thus, an advantage of the system is an ability to recapture energy as pressure generated from the pistons 204 within the sealed hydraulic system that otherwise would be wasted or lost when the flywheel 118 is rotating under its own rotational inertia. For example, when the flywheel 118 is decelerating, coasting, or when the flywheel does not otherwise require any energy to rotate due to gravity and its own rotational inertia.

Figure 7:
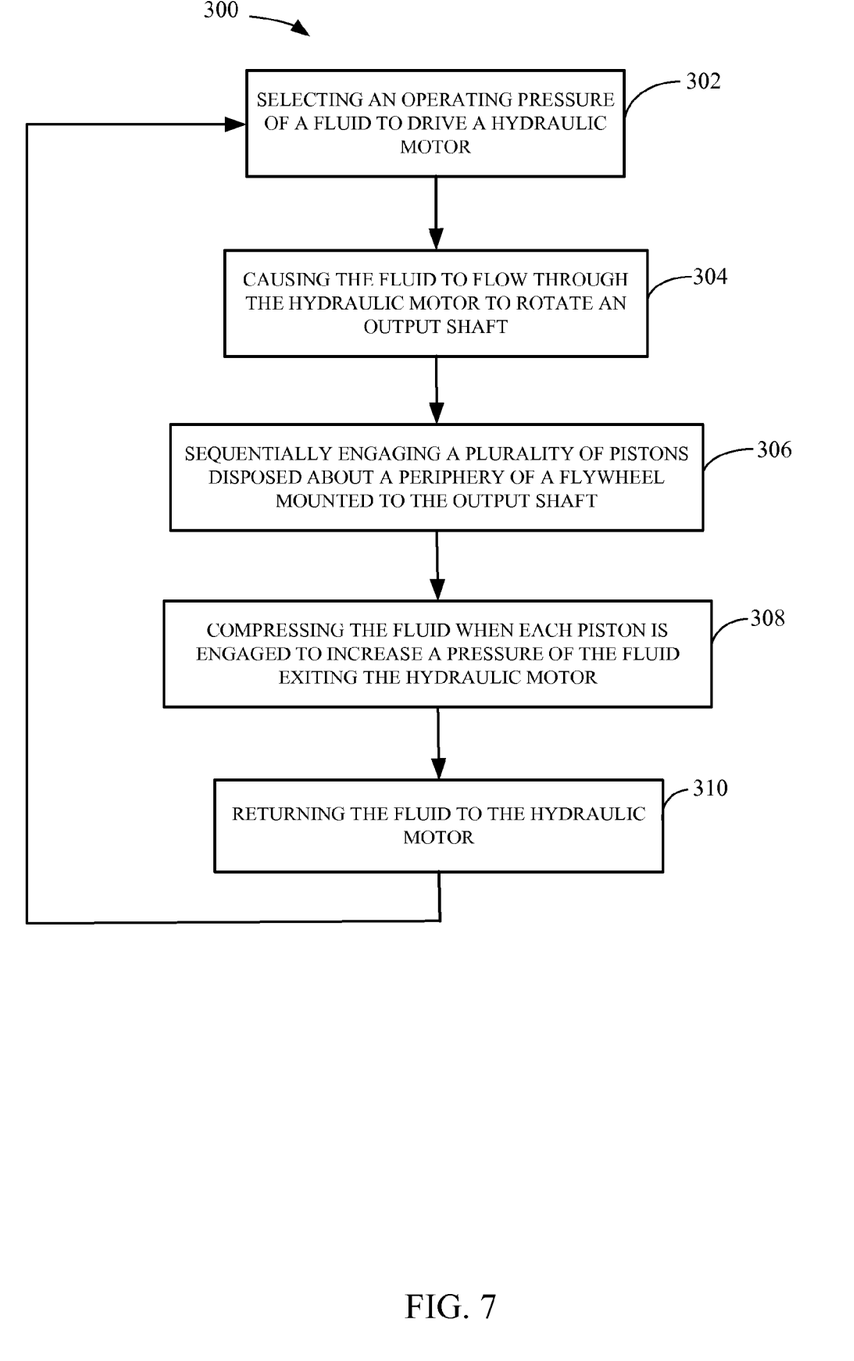
FIG. 7 is a flow diagram of a method to recapture energy of a hydraulic motor.

Referring to FIG. 7, a particular illustrative embodiment of a method to recapture energy of a hydraulic motor is disclosed and generally designated 300. At 302, an operating pressure of a fluid to drive a hydraulic motor is selected. The fluid flows through the hydraulic motor, at 304, to rotate an output shaft. A plurality of pistons disposed about a periphery of a flywheel are each sequentially engaged, at 306. The fluid is compressed, at 308, when each piston is engaged to increase a pressure of the fluid exiting the hydraulic motor to recapture energy that would be wasted when the flywheel is rotating under its own rotational inertia. The fluid is then returned to the hydraulic motor, at 310.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system to recapture energy of a hydraulic motor, the system comprising:
    a primary tank containing fluid at an operating pressure, the fluid to circulate through the system;
    an output shaft;
    a hydraulic motor, wherein the fluid at the operating pressure flows through the hydraulic motor to rotate the output shaft;
    a flywheel adapted to rotate about the output shaft;
    a supply pillow block to support a first side of the flywheel about the output shaft;
    a return pillow block to support an opposing second side the flywheel about the output shaft;
    a plurality of reciprocating pistons mounted about the periphery of the flywheel to recapture energy when the flywheel is rotating under its own rotational inertia;
    a roller configured to sequentially engage each piston of the plurality of pistons as the flywheel rotates to increase the pressure of the fluid exiting the hydraulic motor by compressing the fluid when each piston is engaged by the roller;
    a plurality of cylinders, wherein each cylinder is adapted to slidingly engage a respective piston;
    a plurality of cylinder supply lines, wherein each cylinder supply line is in fluid communication with a respective cylinder of the plurality of cylinders; and
    a plurality of cylinder return lines, wherein each cylinder return line is in fluid communication with a respective cylinder of the plurality of cylinders.

2. The system of claim 1, further comprising a supply fluid transfer collar, the fluid transfer collar comprising a plurality of cylinder supply ports, wherein each cylinder supply port is in fluid communication with the respective cylinder supply line.

3. The system of claim 2, further comprising a return fluid transfer collar, the fluid transfer collar comprising a plurality of cylinder return ports, wherein each cylinder return port is in fluid communication with the respective cylinder return line.

4. The system of claim 3, wherein the plurality of cylinder supply ports each including a one-way valve.

5. The system of claim 4, wherein the plurality of cylinder return ports each including a one-way valve.

6. The system of claim 5, further comprising a check valve interposed between the return line and the primary tank.

7. The system of claim 6, wherein the roller is mounted about a roller shaft connected to a lower pulley.

8. The system of claim 7, further comprising a belt secured around the lower pulley and an upper pulley, the upper pulley is secured to the output shaft.

9. The system of claim 8, wherein the supply pillow block further comprising a conduit in fluid communication with an output shaft supply conduit of the output shaft.

10. The system of claim 9, wherein the output shaft supply conduit is in fluid communication with the supply fluid transfer collar.

11. The system of claim 10, further comprising a secondary tank interposed between the return line and the check valve.

12. The system of claim 11, further comprising an accumulator in fluid communication between the check valve and the primary tank.

13. A method to recapture energy of a hydraulic motor, the method comprising:
    selecting an operating pressure of a fluid to drive a hydraulic motor;
    causing the fluid to flow through the hydraulic motor to rotate an output shaft;
    sequentially engaging a plurality of pistons disposed about a periphery of a flywheel mounted to the output shaft to recapture energy when the flywheel is rotating under its own rotational inertia;
    compressing the fluid when each piston is engaged to increase a pressure of the fluid exiting the hydraulic motor; and
    returning the fluid to the hydraulic motor through a plurality of cylinder return lines, wherein each cylinder return line is in fluid communication with a respective cylinder of the plurality of cylinders.

14. The method of claim 13, further comprising providing a roller adjacent to the flywheel for sequentially engaging the plurality of pistons.

15. The method of claim 14, further comprising transferring the fluid from the hydraulic motor through the output shaft to a fluid transfer collar.

\* \* \* \* \*